Aug. 20, 1929.  E. W. EBY  1,725,703
HOLDER FOR DENTAL FLOSS
Filed Oct. 29, 1926
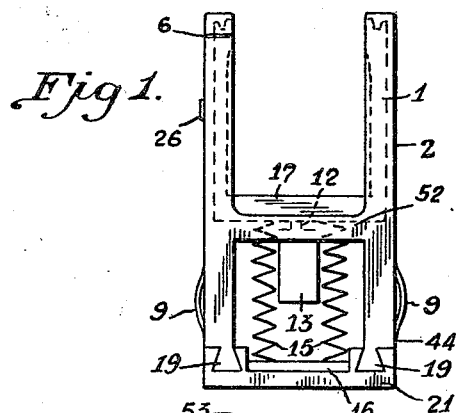
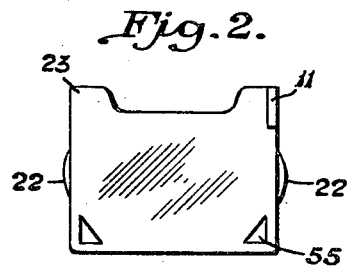
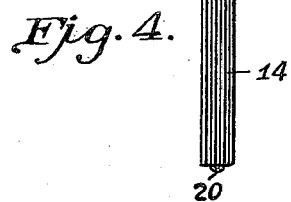
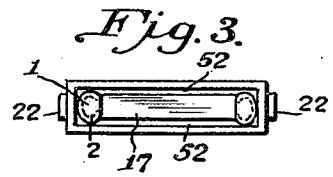
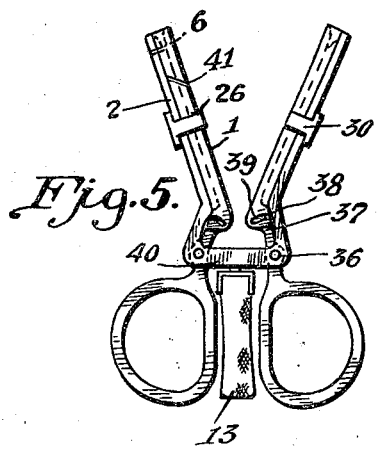
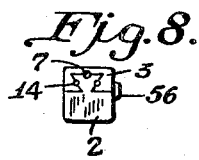
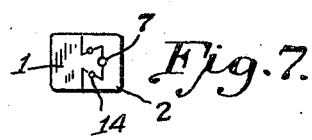
Inventor,
Eldon W. Eby.

Patented Aug. 20, 1929.

1,725,703

UNITED STATES PATENT OFFICE.

ELDON W. EBY, OF TORONTO, ONTARIO, CANADA.

HOLDER FOR DENTAL FLOSS.

Application filed October 29, 1926. Serial No. 145,046.

The invention relates to improvements in holders for dental floss and the objects of the improvement are, first, to provide protection for the arms of the holder including the gripping devices and the dental floss along the said arms, thus keeping the floss in a dry and clean condition so as to readily hold in the gripping devices and be presented for use between the gripping devices in a like condition and furthermore providing ready access to the path of the floss along the said arms thus facilitating the placing of floss and cleansing of instrument; second, to provide a holder for dental floss that may readily be taken apart, thus forming an easily cleansed compact holder and at the same time providing ample and convenient protection for arms and floss.

I attain these objects by means of constructions hereinafter described and illustrated in the accompanying drawings in which—

Fig. 1 is a side elevation of improved holder with casing of receptacle removed;
Fig. 2 a side elevation of casing of receptacle;

Fig. 3 a plan view of Fig. 1 and casing of receptacle in position;

Fig. 4 an end elevation of an inner arm;
Fig. 5 a side elevation of a modification of floss holder and guides;

Fig. 6 a side elevation of removable guide 30 which encircles two arms and is retained in position by means of arched spring 9$^a$, attached in recess 10$^a$ in one of the arms, fitting into concavity shown by convexity 22$^b$ as in receptacle casing retention;

Fig. 7 a cross section of opposing arms of a holder in a movable dove-tail relation;
Fig. 8 a cross section of an arm and floss guard 3, guard being mounted to slide along arm and retained by spring catch 56.

Fig. 1 is a side elevation of improved holder, outer arms 2 almost encircle inner arms 1, the gap being left to facilitate operation and cleaning of instrument. The outer ends of arms 1 and arms 2 form clamps for gripping the floss. In this holder the arms 2 act as guides and guards for arms 1. Receptacle base 21 joined to receptacle frame 44 by sliding dove-tail joint 19 is removable. Permanent receptacle support 52 is mounted higher on receptacle frame 44. The coil spring 15 and the magazine retainer 12 are permanently attached to inner arm cross-piece 17. Cross-piece 16 connects the coil springs 15. Curved flat spring 9 retains the receptacle casing as shown in Fig. 2.

To take holder apart pressure of coil springs 15 is released and receptacle base 21 is slid out. Arms 1 and attachments then slide out lengthwise. This holder is threaded by drawing floss from magazine 13 and along side of right arm 1 as in Fig. 4 under clip-guide 20 to groove 7 and under notch clip 53 at notch 8 at extremity. Arms 1 attachments and receptacle base 21 are replaced. The arms 1 are then depressed and floss is picked up from right arm 1 and drawn across to aligning groove 6 on left arm 2. Arms 1 are then released to grip floss.

Fig. 2 is a side elevation showing casing of receptacle which is retained on receptacle frame 44 Fig. 1 by means of a curved flat spring 9 on said receptacle frame. When receptacle casing is shoved over receptacle frame 44 spring 9 is depressed until concavity on inner side of receptacle casing, shown by convexity 22, comes opposite to it when it raises and holds receptacle casing in position.

Projections 23 may operate as arm guides when not otherwise provided in which case cut out portion 11 may give access to arm and guard. Perforations 55 facilitate cleaning of casing.

Paralleling canals are formed by grooves 14 on floss carrying arm and on the arm or guard adjoining it, grooves on opposite surfaces preferably coinciding. These canals 14 parallel floss receiving longitudinal groove 7 and serve to stop the leakage along the two adjoining surfaces and drain away any liquid penetrating to them. These canals are shown in Figs. 4, 7 and 8.

Fig. 5 shows the application of removable guides 30 (Fig. 6) to a dental floss holder. Arms 2 are mounted on frame 49 and arms 1 are mounted on arms 2 and controlled by means of handles 35. The shafts 37 from handles 35 swing on pins 36 on frame 49 and connected with arms 1 by the sliding turning joints formed by pins 38, on ends of shafts 37, being fitted into slots 39 at bases of arms 1.

Arms 1 slide along arms 2 when handles 35 are operated. Removable guides 30 and joints formed by pins 38 and slots 39 allow the separation of opposing arms 1 and 2. The floss may be carried between the left hand set of arms as well as the right hand set. When thus used floss emerges at slanting groove 41 near cutting edge 26 and aligning groove 6 may be eliminated. Cutting edge 26 is used to cut off used floss.

This application does not claim widely a dental floss holder having a pair of spaced arms and a second pair of arms mounted to slide longitudinally on the first mentioned arms said arms being equipped with gripping devices at their outer ends, or a dental floss holder having an arm with a longitudinal groove on its side to provide a channel for the floss as it is drawn from a receptacle to gripping device, but what I claim as my invention is:

1. The combination in a dental floss holder, of an arm including gripping device, a guard for said arm, a longitudinal floss channel along the adjoining surfaces of said arm and guard leading from receptacle to gripping device, and means allowing the separation of said arm and guard.

2. The combination in a dental floss holder, of an arm including gripping device, a guard for said arm, drainage grooves along the adjoining surfaces of said arm and guard, and means allowing the separation of said arm and guard.

3. The combination in a dental floss holder, of an arm including gripping device, a guard for said arm, a floss channel along the adjoining surfaces of said arm and guard, drainage grooves along said adjoining surfaces, and means allowing the separation of said arm and guard.

4. The combination in a dental floss holder, of an arm, a second arm mounted on the first mentioned arm, a longitudinal floss receiving channel along the adjoining surfaces of said opposing arms, and means allowing the separation of said opposing arms.

5. The combination in a dental floss holder, of an arm, a second arm mounted on the first mentioned arm, drainage grooves along adjoining surfaces of opposing arms on either side of path of floss between said opposing arms, and means allowing the separation of said opposing arms.

6. A dental floss holder including an arm, a second arm mounted to slide longitudinally on the first arm, the two said arms being joined by a sliding longitudinal dove-tail joint.

7. A dental floss holder having an arm including gripping device, a guard mounted on said arm in a movable dovetail relation, a longitudinal floss channel along adjoining surfaces of said arm and guard, and providing means to retain said guard in position.

8. A dental floss holder including an arm, a second arm mounted to oppose the first mentioned arm, one of these arms extending round the sides of the other arm, and yielding means allowing the separation of said opposing arms.

9. A dental floss holder including an arm, a second arm mounted to oppose the first mentioned arm, one of these arms having a movably mounted guide for the other arm, and yielding means allowing the separation of said opposing arms.

10. A dental floss holder including a pair of spaced arms, a second pair of arms mounted to oppose the first mentioned arms, and having a movable arm guiding receptacle case.

11. A dental floss holder including a pair of spaced arms, a second pair of arms mounted to oppose the first mentioned arms, a movable arm guiding receptacle case, and a spring controlling said receptacle case.

12. A dental floss holder including a pair of spaced arms, a second pair of arms mounted to slide longitudinally on the first pair of arms, removable arm guides mounted to embrace the opposing arms, a pair of handles mounted to turn on pins on frame of holder and connected with the movable arms by means of pins on end of handle shaft fitting into slots at base of said movable arms.

13. The combination in a dental floss holder of an arm, a second arm mounted to slide longitudinally on the first mentioned arm, a longitudinal floss receiving channel along the adjoining surface of said opposing arms, and a movably mounted receptacle base.

14. The combination in a dental floss holder of an arm, a second arm mounted to slide longitudinally on the first mentioned arm, a longitudinal floss receiving channel along the adjoining surfaces of said opposing arms, a removable arm guide mounted to embrace the opposing arms, and a pin joint at the base of one of these arms.

Signed at Toronto, Ontario, this 27th day of October, 1926.

ELDON W. EBY.